(12) United States Patent
Lake et al.

(10) Patent No.: US 8,222,169 B2
(45) Date of Patent: Jul. 17, 2012

(54) ZONED ELASTIC LAMINATE AND METHOD TO MANUFACTURE SAME

(75) Inventors: Matthew Boyd Lake, Cumming, GA (US); Bryon Paul Day, Canton, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 886 days.

(21) Appl. No.: 12/185,991

(22) Filed: Aug. 5, 2008

(65) Prior Publication Data

US 2010/0035023 A1 Feb. 11, 2010

(51) Int. Cl.
*B32B 3/00* (2006.01)
*B32B 5/14* (2006.01)
*B32B 27/12* (2006.01)

(52) U.S. Cl. ........ 442/328; 442/394; 428/170; 428/171; 428/172; 428/196

(58) Field of Classification Search .................. 428/167, 428/170, 171, 172, 213, 196; 442/328, 394; 604/385.01, 385.22, 385.24, 385.27
See application file for complete search history.

(56) References Cited

U.S. PATENT DOCUMENTS

| | | |
|---|---|---|
| 4,323,534 A | 4/1982 | DesMarais |
| 4,385,224 A | 5/1983 | Kaufman et al. |
| 4,486,192 A | 12/1984 | Sigl |
| 4,663,220 A | 5/1987 | Wisneski et al. |
| 4,834,738 A | 5/1989 | Kielpikowski et al. |
| 4,965,122 A | 10/1990 | Morman |
| 5,093,422 A | 3/1992 | Himes |
| 5,226,992 A | 7/1993 | Morman |
| 5,304,599 A | 4/1994 | Himes |
| 5,336,545 A | 8/1994 | Morman |
| 5,462,708 A | 10/1995 | Swenson et al. |
| 5,468,428 A | 11/1995 | Hanschen et al. |
| 5,501,679 A | 3/1996 | Krueger et al. |
| 5,667,625 A | 9/1997 | Alikhan |
| 5,709,921 A | 1/1998 | Shawver |
| 5,769,993 A | 6/1998 | Baldauf |
| 5,789,065 A | 8/1998 | Haffner et al. |
| 5,853,881 A | 12/1998 | Estey et al. |
| 6,001,460 A | 12/1999 | Morman et al. |
| 6,015,764 A | 1/2000 | McCormack et al. |
| 6,159,584 A | 12/2000 | Eaton et al. |
| 6,193,701 B1 | 2/2001 | Van Gompel et al. |
| 6,207,237 B1 | 3/2001 | Haffner |
| 6,472,084 B1 | 10/2002 | Middlesworth et al. |
| 2003/0039772 A1 | 2/2003 | Takeyama et al. |
| 2005/0102735 A1 | 5/2005 | Popp et al. |
| 2006/0111686 A1 | 5/2006 | Schneider |
| 2006/0224139 A1 | 10/2006 | Erdman et al. |

FOREIGN PATENT DOCUMENTS

| | | |
|---|---|---|
| EP | 0930968 B1 | 2/2004 |
| WO | WO 98/16677 | 4/1998 |

(Continued)

*Primary Examiner* — Jenna Johnson
(74) *Attorney, Agent, or Firm* — Nancy M. Klembus; Richard M. Shane (57) ABSTRACT

The present invention includes a neck-bonded laminate and a process for forming a neck-bonded elastic laminate, the laminate including a primary elastic region and a secondary elastic region. An exemplary process for forming the laminate includes providing a necked material and overlaying the necked material with an elastic sheet. The necked material and elastic sheet are passed through a nip between two rollers, the rollers being configured to form a primary elastic region and a secondary elastic region and the secondary elastic region having higher strength than the primary elastic region.

10 Claims, 7 Drawing Sheets

FOREIGN PATENT DOCUMENTS

| WO | WO 99/32272 | 7/1999 |
| WO | WO 01/12427 A1 | 2/2001 |
| WO | WO 2005068165 A1 * | 7/2005 |
| WO | WO 2006/001737 | 1/2006 |

* cited by examiner

ZONED ELASTIC LAMINATE AND METHOD TO MANUFACTURE SAME

TECHNICAL FIELD OF THE INVENTION

The present invention relates generally to the field of elastic materials and the like, and more particularly to elastomeric materials having elastic regions of differing strengths.

BACKGROUND

Elastomeric materials have been used in numerous applications to improve the fit or function of a garment or product. For example, elastomeric materials have been used in diapers, feminine care products, adult care products, health care garments and industrial protective garments. In many applications, elastic materials are bonded to one or more other layers in order to form laminated structures for use in these garments and products.

Elastic composites which are suitable for use in such products have been formed by bonding an elastic polymer layer in the form of a film, foam, nonwoven web or parallel strands, to one or more nonwoven facing layers. A particularly suitable elastic composite is a "neck-bonded laminate" ("NBL"). In this type of elastic composite, an elastic layer is bonded to one or two "necked" facing layers while the elastic layer is relaxed. The facing layer(s) are extended or "necked" to reduce their dimensions in the direction orthogonal to the extension. A "necked" material or web refers to a material or web which has been constricted in at least one dimension by processes such as, for example, drawing. Neck-bonded laminates can have cross-directional stretch and recovery properties. Neck-bonded laminates are described, for instance, in U.S. Pat. No. 5,853,881 to Estey et al., U.S. Pat. No. 4,965,122 to Morman, and U.S. Pat. No. 6,001,460 to Morman et al., and U.S. Pat. No. 5,789,065 to Haffner et al., which are incorporated herein by reference.

In the construction of such garments or products, the highly elastic components are typically attached to components which are stronger with less or no elasticity. The attachment between the highly elastic component and the stronger less elastic component is often critical and complicated. Thus, there is a need for the production of a continuous material with a highly elastic region and a stronger less elastic region offers good opportunities for significant product simplification and improvement by eliminating this interface.

The present invention addresses this need by providing an elastic material and process which forms a highly elastic region and a region which has good strength for improved processability of the laminate into a product.

SUMMARY OF THE INVENTION

Objects and advantages of the invention will be set forth in part in the following description, or may be obvious from the description, or may be learned through practice of the invention. The invention relates to a process for forming a neck-bonded laminate which includes the steps of providing at least one necked material. In selected embodiments, a neckable non-extensible material may be provided and a tensioning force may be applied to the non-extensible material to neck the material. An elastic sheet is provided and overlaid onto the necked material. The elastic sheet and necked materials are passed through a nip, defined between two rollers. The nip may include a primary nip section and at least one secondary nip section which has a narrower gap than the primary nip section. The primary nip section may be recessed into the surface of the roller. The recess may, in selected embodiments, extend around the circumference of the roller. In some embodiments, at least one of the rollers may have a protrusion extending from the surface of the roller to form a secondary nip section. In particular embodiments, the protrusion may extend continuously around the circumference of the roller.

The laminate is formed by passing the necked material and elastic sheet through the nip. The laminate includes at least one primary elastic region and at least one secondary elastic region. The two elastic regions have substantially the same basis weight. The primary elastic region is formed in the primary nip section, that is, the area of the nip which has the larger gap. In some embodiments, this would be in the area of the nip where the protrusion is not present. The secondary elastic region is formed in the secondary nip section, that is, the area of the nip which has the narrower gap.

The primary elastic region and the secondary elastic region are distinguishable in that the load required to extend the secondary elastic region is at least about 30% greater than the load required to extend the primary elastic region to elongations between about 10% and about 90% of their original lengths. That is, the load required to extend the secondary elastic region to a particular elongation between about 10% and about 90% of its original length is at least about 30% greater than the load required to extend the primary elastic region to the same percent elongation. Additionally, the peak load of the secondary elastic region is at least 10% greater than the peak load of the primary elastic region.

Aspects of the invention will be described below in greater detail with reference to embodiments shown in the figures.

DETAILED DESCRIPTION

The invention will now be described in detail with reference to particular embodiments thereof. The embodiments are provided by way of explanation of the invention, and are not meant as a limitation of the invention. For example, features described or illustrated as part of one embodiment may be used with another embodiment to yield still a further embodiment. It is intended that the present invention include these and other modifications and variations as come within the scope and spirit of the invention.

Figure 1:
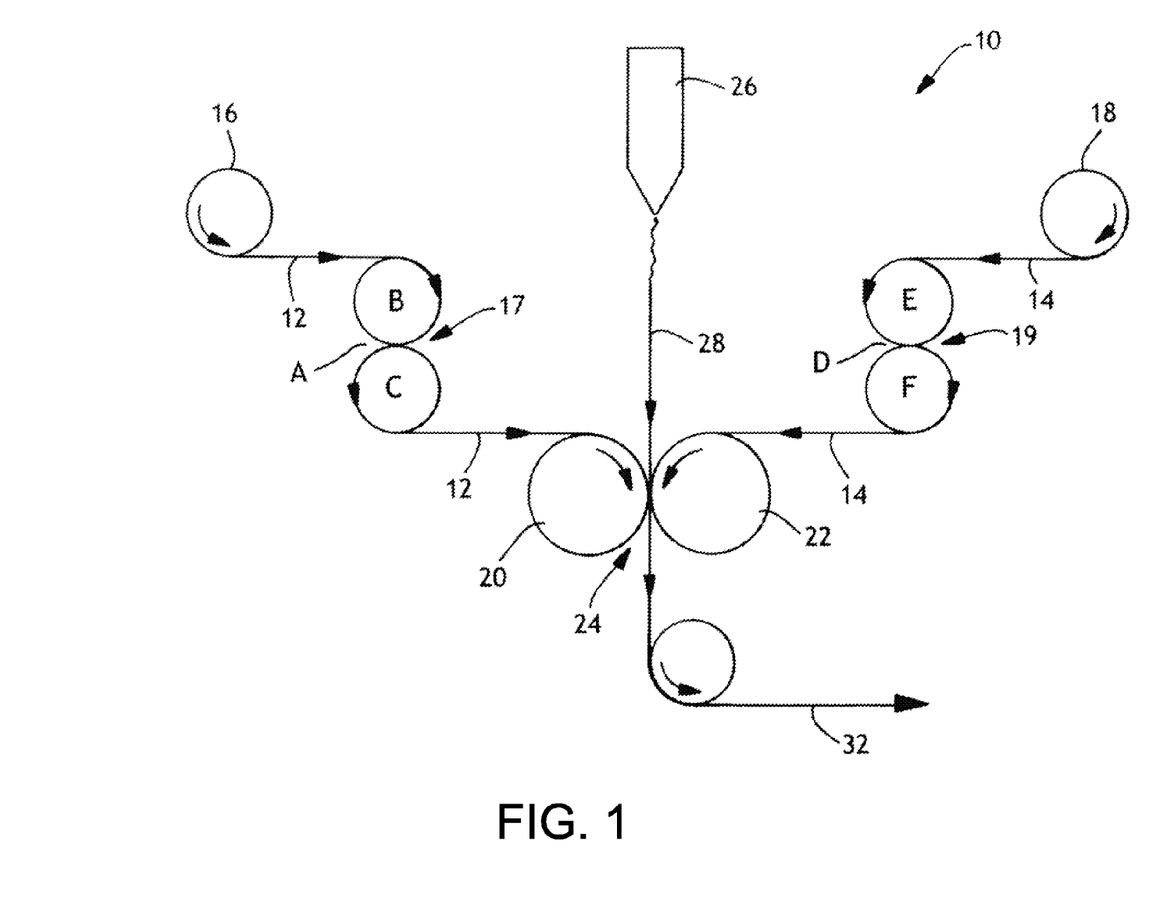
FIG. 1 is a schematic representation of an exemplary process in accordance with the present invention.

Referring to FIG. 1, a process 10 for forming a laminate 32 according to the present invention is illustrated. The depicted method is related in certain aspects to the method described in U.S. Pat. No. 5,226,992 for making an elastic neck-bonded laminate, and the '992 patent is incorporated herein in its entirety for all purposes. As shown in FIG. 1, a neckable generally non-extensible material 12 is unwound from a supply roll 16 and travels in the direction illustrated by the arrows.

"Non-extensible" refers to a material that does not stretch or extend by 25% of its relaxed length without fracture upon application of a biasing force. Materials that are elastomeric are not considered "non-extensible." The terms "elastomeric" and "elastic" refer to a material or composite which can be elongated by at least 25% of its relaxed length and which will recover, upon release of the applied force, at least 10% of its elongation. It is generally preferred that the elastomeric material or composite be capable of being elongated by at least 35% and more preferably by at least 50% of its relaxed length. It is also generally preferred that the elastomeric material or composite be capable of recovering at least about 25% of its elongation and more preferably at least about 50% of its elongation.

Many nonwoven webs are suitable for use as non-extensible materials. The term "nonwoven web" refers to a web that has a structure of individual fibers or threads which are interlaid, but not in an identifiable, repeating manner. Nonwoven webs may be formed, for example, by a variety of processes including melt-blowing, spunbonding, and bonded carded web processes. For example, a meltblown web may be extendable, but not have recovery properties and, thus, be an extensible but non-elastic material. Additional webs which are suitable for use as neckable non-extensible materials in the present invention are described in detail below.

The material 12 passes through the nip A of the drive roller arrangement 17 formed by rollers B and C in a "reverse-S" path. Similarly, an additional neckable generally non-extensible material 14 may, if desired, be unwound from a supply roll 18 traveling in the direction illustrated by the arrows. The material 14 passes through the nip D of the drive roller arrangement 19 formed by rollers E and F in an "S" path. Each of the materials 12 and 14 include two longitudinal edges which extend in the machine direction. "Machine direction" refers to the length of a material in the direction in which it is produced or converted, as opposed to the "cross direction" or "cross-machine direction" which refers to the width of a material in a direction generally perpendicular to the machine direction.

Materials 12 and 14 are necked prior to passing through the nip 24 formed by rollers 20 and 22, where the materials 12 and 14 are attached to the elastomeric sheet 28. As shown in FIG. 1, the material 12 may be necked between the supply roll 16 and rollers B and C by controlling the peripheral linear speed of the supply roll 16 to be less than the peripheral linear speed of the rollers B and C. The material 12 is thus tensioned in the machine direction and necked-in in the cross direction between the supply roll and the S-roll arrangement.

Alternately, the peripheral linear speed of rollers B and C may be controlled to be less than the peripheral linear speed of the rollers 20 and 22 of the bonding roller arrangement, causing the material 12 to be tensioned in the machine direction and necked-in in the cross direction between the rollers B and C and rollers 20 and 22. Similarly, the material 14 may be necked-in between the rollers E and F and rollers 20 and 22.

By adjusting the difference in speeds of the rollers, the materials 12 and 14 may be tensioned so that the materials neck a desired amount and are maintained in a necked condition while the elastomeric sheet 28 is attached to the materials 12 and 14 during their passage through the bonding rollers 20 and 22 to form the laminate 32.

The necking-in may be aided by passing one or both of the nonwoven layers 12 and 14 through an oven or other suitable heating device (not shown) positioned between the S-rollers and the bonding rollers 20 and 22, or the supply rolls and the S-rollers. One or both of the bonding rollers may be heated and the pressure between these two rollers may be adjusted by well-known means.

If desired, the materials 12 or 14 may be supplied as a necked material directly from a supply roll.

Polypropylene spunbond webs are particularly suitable for use as materials 12 and 14. Suitable necking temperatures for polypropylene spunbond webs may range from about 220-280° F. Each material 12, 14 can be necked to about 25-80% of its initial width, or more desirably to about 30-70% of its initial width.

In the embodiment of the process 10 shown in FIG. 1, an elastic polymer mixture is heated and blended in an apparatus 26 and extruded through a slot die in the form of an elastic film sheet 28 in between the necked materials 12 and 14, although a single necked material may also be used. The elastic sheet 28 may not be completely solidified prior to passing through the nip 24, but rather may still flow under pressure. The term "polymer" generally includes but is not limited to, homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the molecule. These configurations include, but are not limited to isotactic, syndiotactic and random symmetries.

The resulting neck-bonded laminate 32 has elastic stretch and recovery properties in the cross-direction. Stretching of the laminate 32 in the cross direction causes the nonwoven layers 12 and 14 to become un-necked, and relaxation of the stretched laminate causes the nonwoven layers to become necked again.

In some embodiments, the elastomeric sheet 28 may alternately be unwound from a supply roll (not shown). In such embodiments, the sheet 28 may be heated prior to entering the nip 24 sufficiently to permit the sheet 28 to flow under pressure. Heated rollers may also be utilized, if desired. The elastic material may have a width that is less than that of the materials 12 and 14 after they are necked. The elastomeric sheet 28 may also be a composite of different materials. Particular embodiments of suitable elastomeric materials are described in detail below.

When one necked material is employed, it is joined to one side of the elastic sheet 28. When at least two necked materials are employed, the first two materials are joined to each side of the elastic sheet, the elastic sheet being positioned between the necked materials.

For a given combination of materials, the remaining processing conditions necessary to achieve a satisfactory bond can be readily determined by one of ordinary skill in the art.

The relation between the original dimensions of the neckable material to its dimensions after tensioning determine the approximate limits of stretch of the laminate 32. For example, if a portion of laminate 32 has a width of, for example, 10 cm and it is desired that such material be stretchable to 150% of its width (i.e., to 15 cm), then the original width of the underlying materials 12 and 14 is at least 15 cm. As should readily be understood, the elastic limit of the sheet 28 need only be as great as the maximum desired elastic limit of the materials 12 and 14. In other words, the elastic sheet may be configured to permit the necked material to expand back to its non-necked state.

Figure 2:
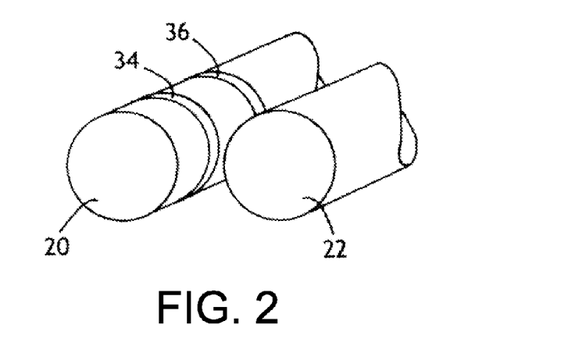
FIG. 2 is a representation of bonding rolls useful in an embodiment of the present invention.

One or more of the bonding rolls 20 or 22 may be formed to define a nip having a primary nip section and a secondary nip section. The primary nip section may be created by forming a recess in the surface of a roller such that the gap formed by primary nip section is larger than the gap formed by the secondary nip section. Selected configurations of the bonding rolls may include raised protrusions such as protrusions 34 and 36, as seen in FIG. 2. The protrusions 34 and 36 create a region of reduced nip between the bonding rolls 20 and 22. This variation in distance between the bonding rolls 20 and 22 creates regions of differential bonding in the laminate 32 as the elastic sheet 28 and the necked materials 12, 14 pass through the nip 24 and are attached together. "Attached" and "joined" refers to the bonding, adhering, connecting, and any other method for attaching or joining two elements. Other methods of roller formation and construction may be used to create a nip which has at least two areas which have different gap dimensions.

The regions of differential bonding produce a laminate having at least two distinct regions. These regions can be characterized by their varying elasticity, strength and thickness. These regions of differential bonding can include a primary elastic region (FIG. 8) having higher elasticity, a relatively small transitional region (FIG. 7), and a secondary elastic region having higher strength (FIGS. 5 and 6).

The primary elastic region 46 may be formed by the primary nip section of the bonding rolls 20 and 22 in the areas having a larger gap, e.g. where protrusions 34 and 36 are not present on the rolls or where a recess has been formed in at least one of the rolls. The primary elastic region 46 of the laminate 32 is bonded to form a laminate which has higher elasticity and is thicker in cross-section than the secondary elastic region.

The secondary elastic region 38 is formed in the area of the nip having a narrower gap, e.g. where the protrusions 34 and 36 are positioned or where a recess has not been formed in the roll. The secondary elastic region 38 has higher strength properties than the primary elastic region, and is thinner in cross-section than the primary elastic region (FIG. 7).

Figure 5:
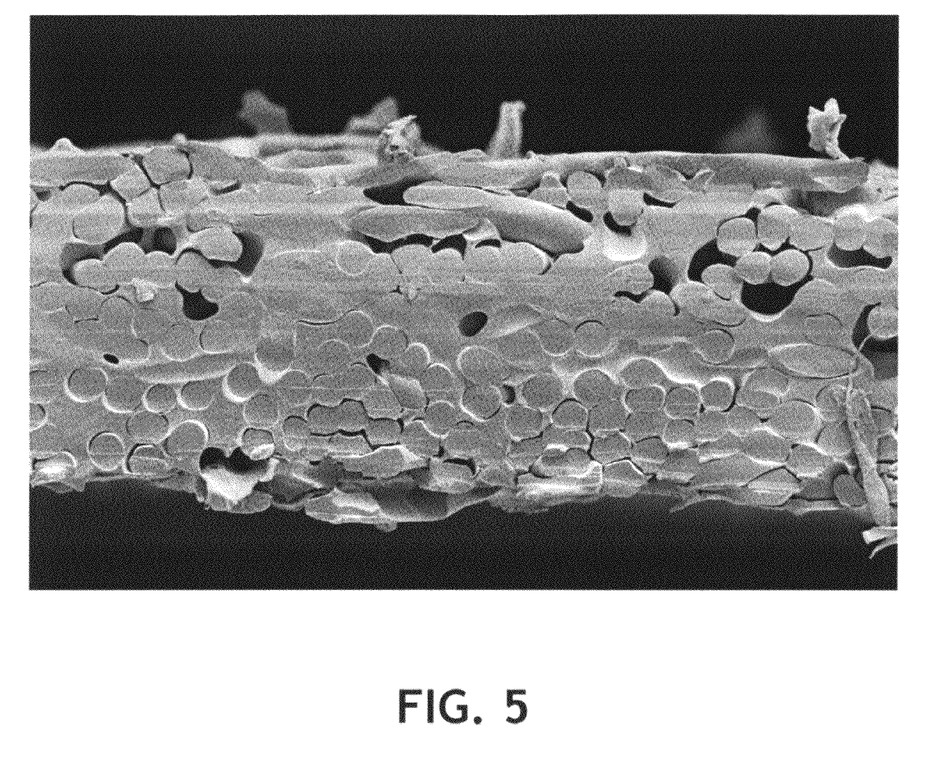
FIG. 5 is a photomicrograph cross-sectional view of the primary elastic region of an embodiment of the present invention.
Figure 6:
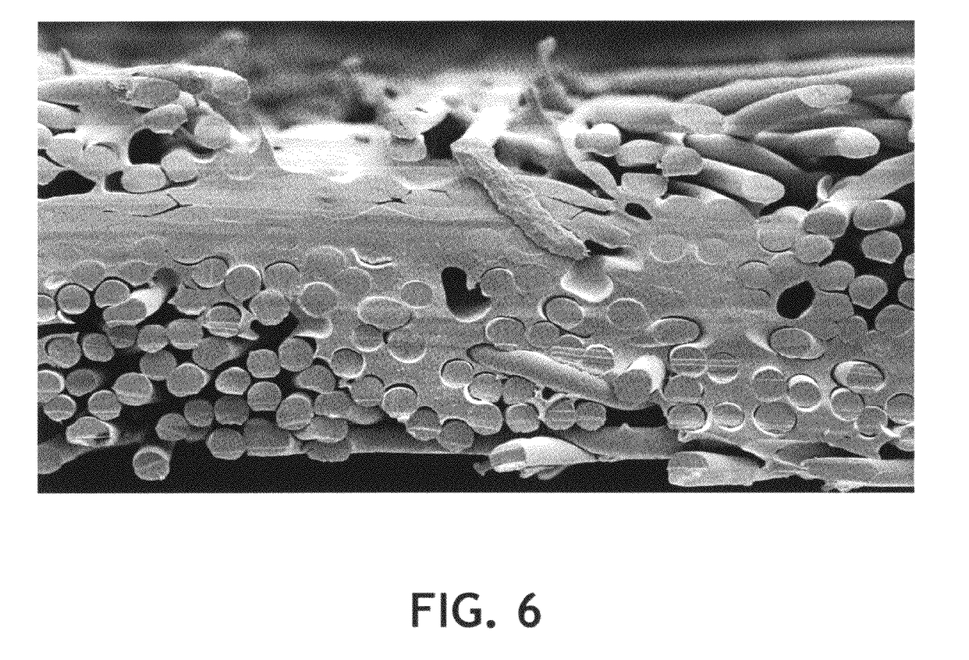
FIG. 6 is an additional photomicrograph cross-sectional view of the primary elastic region of the embodiment depicted in FIG. 5.

In the secondary elastic region 38, as shown in FIGS. 5 and 6, the fibers of the nonwoven layers have been embedded into the film layer. For selected embodiments, at least about 10% of the fibers may be embedded into the film layer in the secondary elastic region. In other embodiments, the percentage of fibers that may be embedded into the film layer may range from about 20% to about 90%, or more desirably from about 30% to about 80%. More desirable embodiments may include a percentage of fibers embedded into the film layer in the range of about 40% to about 70%.

Figure 7:
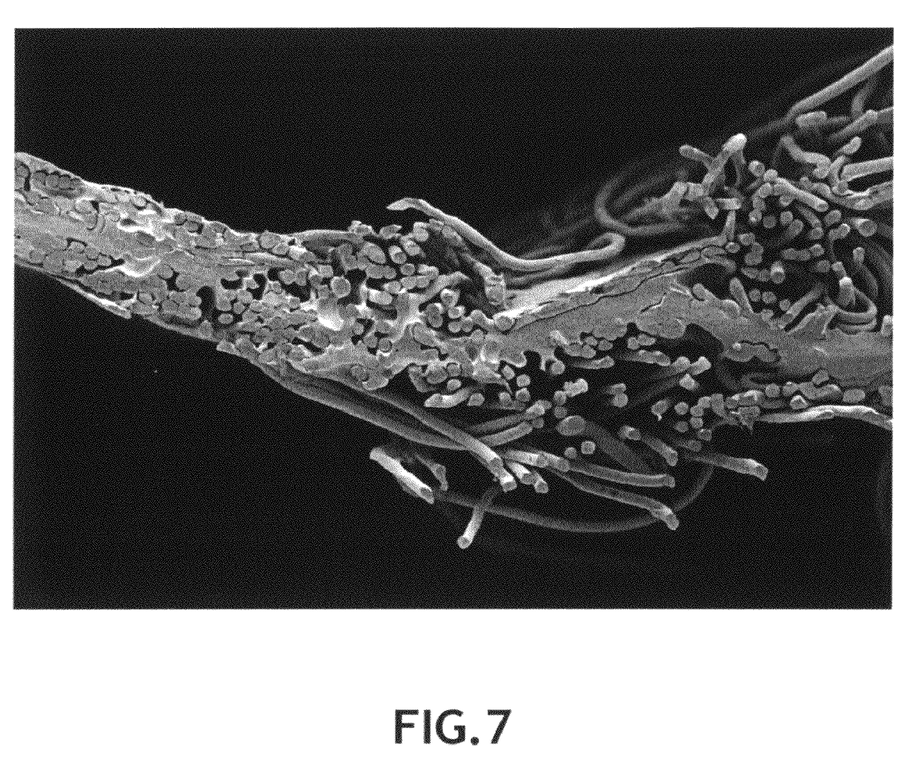
FIG. 7 is a photomicrograph cross-sectional view of the transition zone between the primary elastic region and the secondary elastic region of the embodiment depicted in FIGS. 5 and 6.

The percentage of fibers that are embedded into the film layer may be determined by cross-sectioning the secondary elastic region (as shown in FIGS. 5-7) and counting the number of fibers that have at least one-third (⅓) of their diameter visible (whether the fiber is cross-sectioned or not) in a suitable photomicrograph. The number of fibers having at least one-third (⅓) of their visible circumference in contact with the film layer is then counted by visual examination. The percentage of fibers that are embedded into the film layer is then calculated by dividing the number of fibers having at least a third of their visible area embedded into the film layer by the number of fibers that are visible in the cross-sectional view.

Figure 3:
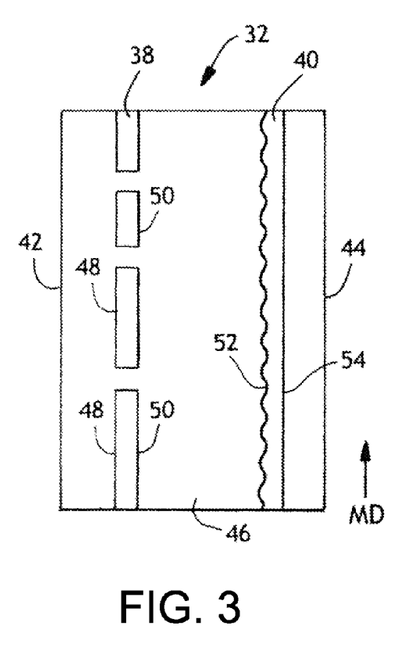
FIG. 3 is a planar view of a material which may be formed in accordance with an embodiment of the present invention.
Figure 4:
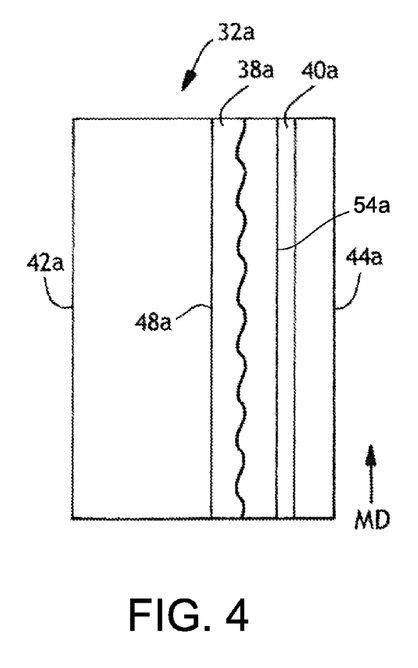
FIG. 4 is a planar view of an alternate material which may be formed in accordance with an embodiment of the present invention.

As shown in FIGS. 3 and 4, the nip or distance between the bonding rolls 20 and 22 can be selected so that the raised regions 34 and 36 create bonded secondary elastic regions 38, 38a, 40 and 40a, which retain elasticity in the cross-machine direction. These secondary elastic regions 38 and 40 have higher tensile strength and stability for converting of the laminate 32 than the primary elastic region.

Referring to FIG. 3, the laminate 32 includes two secondary elastic regions 38 and 40 which extend along the machine direction. The secondary elastic region 38 has two longitudinal edges 48 and 50 which are substantially parallel to the edges 42 and 44, respectively, of the laminate 32.

The dimensions of the secondary elastic region 38 in the machine direction and cross-machine direction may vary significantly. In the cross-machine direction, it is desirable that the secondary elastic region is at least one centimeter wide to provide sufficient stability for converting of the laminate into a product. The secondary elastic region may be significantly wider than one centimeter, and its width may be determined by the requirements of the particular end-product. In some embodiments, the secondary elastic region may be about two centimeters in width. In other embodiments, the width of the secondary elastic region may be in the range of two to ten centimeters.

The length of the secondary elastic region in the machine direction may also vary considerably, depending on the requirements of the particular end-product. The secondary elastic region may be discontinuous in the machine direction. A plurality of secondary elastic regions may be formed along the length of the laminate. If desired, such secondary elastic regions may be aligned with each other, if desired, in the cross-direction. It is desirable that, in some embodiments, the secondary elastic region is at least three (3) centimeters long in the machine direction. In other embodiments, the secondary elastic region may be longer than three cm in the machine direction, such as, for example, seven to ten cm. The secondary elastic region may also be substantially continuous in the machine direction.

The edges of the secondary elastic region may be formed in a variety of patterns. As seen in FIG. 3, the longitudinal edges 42 and 44 of the laminate 32 may be substantially parallel to the edge 54 of the secondary elastic region 40. The other longitudinal edge of such secondary elastic regions may have many alternate shapes and configurations, such as edge 52 having an undulating pattern.

FIG. 4 depicts a laminate 32a having secondary elastic regions 38a and 40a. Each secondary elastic region 38a and 40a may include at least one longitudinal edge which is generally parallel to a longitudinal edge 42a or 44a of the laminate 32a. The longitudinal edges 48a and 54a of the secondary elastic regions 38a and 40a may form other various patterns. The primary and secondary elastic regions may be formed in any of a variety of shapes and configurations, and may not have an edge which is substantially parallel to the longitudinal edge of the laminate.

It should be understood that the laminate 32 is not limited to any particular number of material layers. For example, the underlying necked material 12 may include various combinations of woven or nonwoven layers to achieve desired characteristics of the laminate 32 depending on the particular end use of the material. Likewise, the elastomeric sheet 28 may include various combinations of materials to provide the laminate 32 with desired characteristics.

The necked material 12 may be any one or a combination of suitable materials that are capable of being necked-in and attached to an elastomeric sheet. Various fibrous woven and nonwoven fabrics may be suitable for use as the non-extensible material of the present invention. For example, the non-extensible or necked material may include a meltblown web, a spunbond web, or a bonded-carded-web composed of synthetic continuous or discrete polymer fibers and/or natural fibers, an airlaid web or a hydraulically entangled web, as well as combinations thereof. The various fabrics can be composed of natural fibers, synthetic fibers or combinations thereof. In particular aspects, the material may be comprised of polymer fibers, networks, laminates, liquid permeable films, liquid impermeable films, cellulosic fibers, rayon, water swellable gels, as well as combinations thereof. Suitable polymers can include polypropylene, polyethylene, polyester, and bicomponent materials composed of these polyolefins. The fibers forming the nonwoven material may be mono-component, bi-component, or multi-component fibers, and combinations thereof.

The necked materials 12 and 14 may be formed using various polymers. Suitable generally inelastic polymers include polyolefins such as homopolymers of ethylene, propylene, and butylene, and copolymers of these monomers including generally up to 10% by weight of an alpha-olefin comonomer having up to about 12 carbon atoms. Inelastic polymers also include certain polyamides, polyesters and the like. Suitable elastic polymers include copolymers of ethylene, propylene and butylene with an alpha-olefin comonomer which generally contains more than 10% but less than 90% by weight of each comonomer. Elastic olefin copolymers include, for instance, single-site catalyzed copolymers of ethylene with more than 10% by weight of an alpha-olefin comonomer, having a density of about 0.855 to 0.900 grams/cm$^3$. Suitable elastic polymers also include ethylene vinyl acetate, ethylene ethyl acrylate, ethylene methyl acrylate, ethylene butyl acrylate, polyurethane, block co-poly(ether-ester) and block co-poly(amide-ether).

The elastomeric sheet 28 may be any one or combination of materials that are capable of being attached to the necked material 12 to provide a desired degree of elasticity to the resulting laminate. Depending on the end use of the material, the elastomeric sheet 28 may be breathable and liquid impermeable or liquid resistant and may be a film, foam or other elastomeric material.

The elastic sheet 28 may include, for example, elastomeric polymers that may be elastic polyesters, elastic polyurethanes, elastic polyamides, elastic polyolefins, metallocenes and elastic A—B—A' block copolymers, where A and A' are the same or different thermoplastic polymers, and where B is an elastomeric polymer block, such as styrenic block copolymers. Particularly suitable thermoplastic elastomers are available from Kraton Polymers LLC of Houston, Tex. under the trade name KRATON®. KRATON® polymers include styrene-diene block copolymers, such as styrene-butadiene, styrene-isoprene, styrene-butadiene-styrene, and styrene-isoprene-styrene. KRATON® polymers also include styrene-olefin block copolymers formed by selective hydrogenation of styrene-diene block copolymers. Examples of such styrene-olefin block copolymers include styrene-(ethylene-butylene), styrene-(ethylene-propylene), styrene-(ethylene-butylene)-styrene, styrene-(ethylene-propylene)-styrene, styrene-(ethylene-butylene)-styrene-(ethylene-butylene), styrene-(ethylene-propylene)-styrene-(ethylene-propylene), and styrene-ethylene-(ethylene-propylene)-styrene. Specific KRATON® block copolymers include those sold under the brand names G 1652, G 1657, G 1730, MD6673, and MD6973. Various suitable styrenic block copolymers are described in U.S. Pat. Nos. 4,663,220, 4,323,534, 4,834,738, 5,093,422 and 5,304,599, which are hereby incorporated in their entirety by reference thereto for all purposes.

Suitable elastomeric copolymers include ethylene vinyl acetate (EVA), ethylene-octene copolymers, and ethylene-propylene copolymers. Examples of elastomeric polyolefins include ultra-low density elastomeric polypropylenes and polyethylenes, such as those produced by "single-site" or "metallocene" catalysis methods. Similar copolymers and polyolefins are described in U.S. Pat. Nos. 5,709,921, 6,015,764 or 6,207,237.

It should be understood that the elastic materials of the present invention are not limited to the foregoing list of exemplary elastomeric block copolymers and other suitable elastomeric block copolymers may alternatively be utilized in the disclosed elastic webs.

The elastic layer may also include other components of the types and amounts that do not adversely affect its elastic performance. Examples of other components include pigments, antioxidants, stabilizers, surfactants, waxes, flow promoters, particulate fillers, and processing aids. The ingredients of the elastic layer may be combined using roll milling, extrusion mixing, and other suitable mixing techniques.

The elastomeric materials described herein are useful in various industrial and personal product applications, including, for example, diapers, feminine care products, adult care products, health care protective articles including gowns and drapes, and industrial protective garments.

EXAMPLE 1

Samples were prepared to demonstrate the properties achievable in the materials and processes of the present invention. A neck-bonded laminate was made in general accordance with U.S. Pat. No. 5,336,545 to Morman. Two necked webs of spunbonded polypropylene having basis weights of about 0.75 gsm (25 gsm) were joined to each side of an elastic polyethylene film layer. The resulting laminate had a basis weight of about 3.8 osy (128 gsm).

FIGS. 5-8 are photomicrographs of a cross-section of an exemplary area of a secondary elastic region taken of a sample produced by hand. A steel plate having a length of 12 inches (30.5 cm), a width of 0.75 inches (1.9 cm) and a thickness of one eighth of an inch (0.3 cm) was placed in contact with the heated plates of a Carver press until the steel plate reached a temperature of about 350° F. The neck-bonded laminate as described above was placed in the press, with a portion of the steel plate overlaying a portion of the sample. The steel plate was oriented with its longer dimension aligned with the machine direction of the neck-bonded laminate. Approximately 3500 psi was applied to the heated plates of the Carver press for a period of three seconds.

FIGS. 5 and 6 depict cross-sectional views of this exemplary secondary elastic region, where some of the fibers of the necked material are embedded into the film layer. As seen in FIG. 5, greater than 60% of the fibers are embedded into the film layer. In FIG. 6, greater than 40% of the fibers are embedded into the film layer.

FIG. 7 shows a cross-sectional view of the relatively narrow transition zone that can be formed between the secondary elastic region (on the left side of the image) and the primary elastic region of the laminate (on the right side of the image). As seen therein, the thickness or "z" dimension of the secondary elastic region is significantly reduced when compared to the primary elastic region. In some embodiments, the thickness of the secondary elastic region is at least about 30% less than the thickness of the primary elastic region. In other embodiments, the thickness of the secondary elastic region may be at least about 50% less than the thickness of the primary elastic region.

Figure 8:
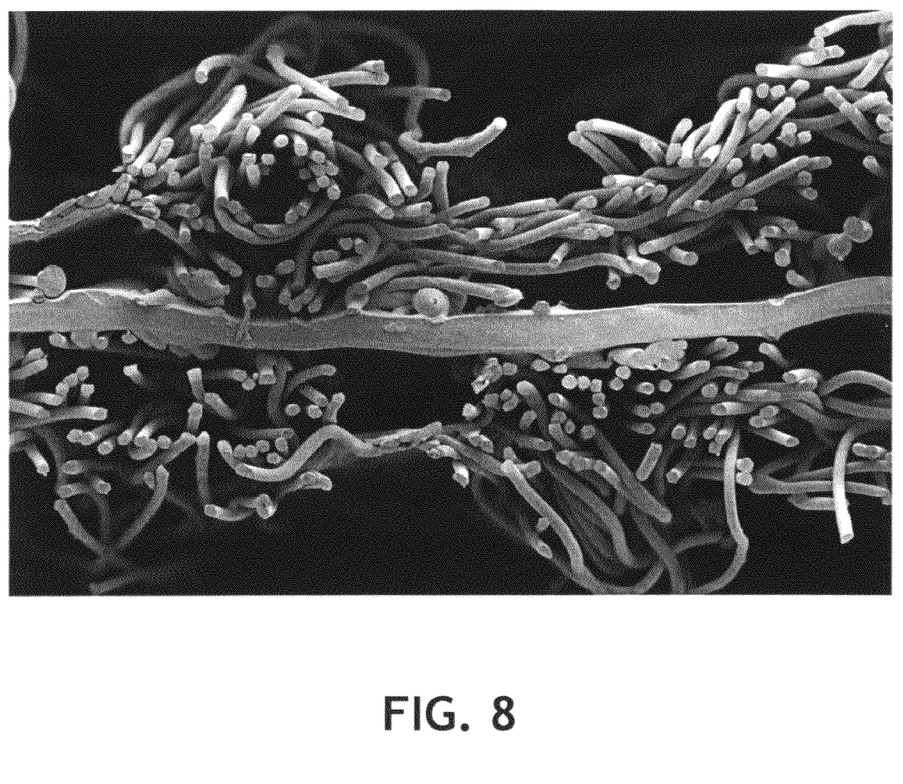
FIG. 8 is a photomicrograph cross-sectional view of the highly elastic region of an embodiment of the present invention.

FIG. 8 is a cross-sectional image of the primary elastic region of a laminate according to the present invention. As can be seen in this view, the fibers of the nonwoven web are not embedded into the film layer as seen in FIGS. 5 and 6.

EXAMPLE 2

Additional samples were prepared from a neck-bonded laminate made in general accordance with U.S. Pat. No. 5,336,545 to Morman. As in the sample prepared above, two necked webs of spunbonded polypropylene having basis weights of about 0.75 gsm (25 gsm) were joined to each side of an elastic polyethylene film layer. The resulting laminate had a basis weight of about 3.8 osy (128 gsm).

Four sample groups were prepared from this neck bonded laminate. Sample 1 represented the primary elastic region of the material of the present invention, and no post-bonding or processing was done to this sample. Samples 2-4 were subjected to post-bonding and represent secondary elastic regions of the present invention. Each of the Samples 2-4 were passed individually through two smooth calendar rolls which were heated to 250° F. at a speed of thirty (30) feet per minute (9.14 meters per minute). A pressure of 45 psi (3.16 kg-f/cm$^2$) was applied to Sample 2, and pressures of 40 psi (2.81 kg-f/cm$^2$) and 35 psi (2.46 kg-f/cm$^2$), respectively, were applied to Samples 3 and 4.

The difference in elastic properties between the primary elastic region and the secondary elastic regions can be delineated by comparing the peak load and the load required to extend the samples of each region by a set percentage of their original length.

Figure 9:
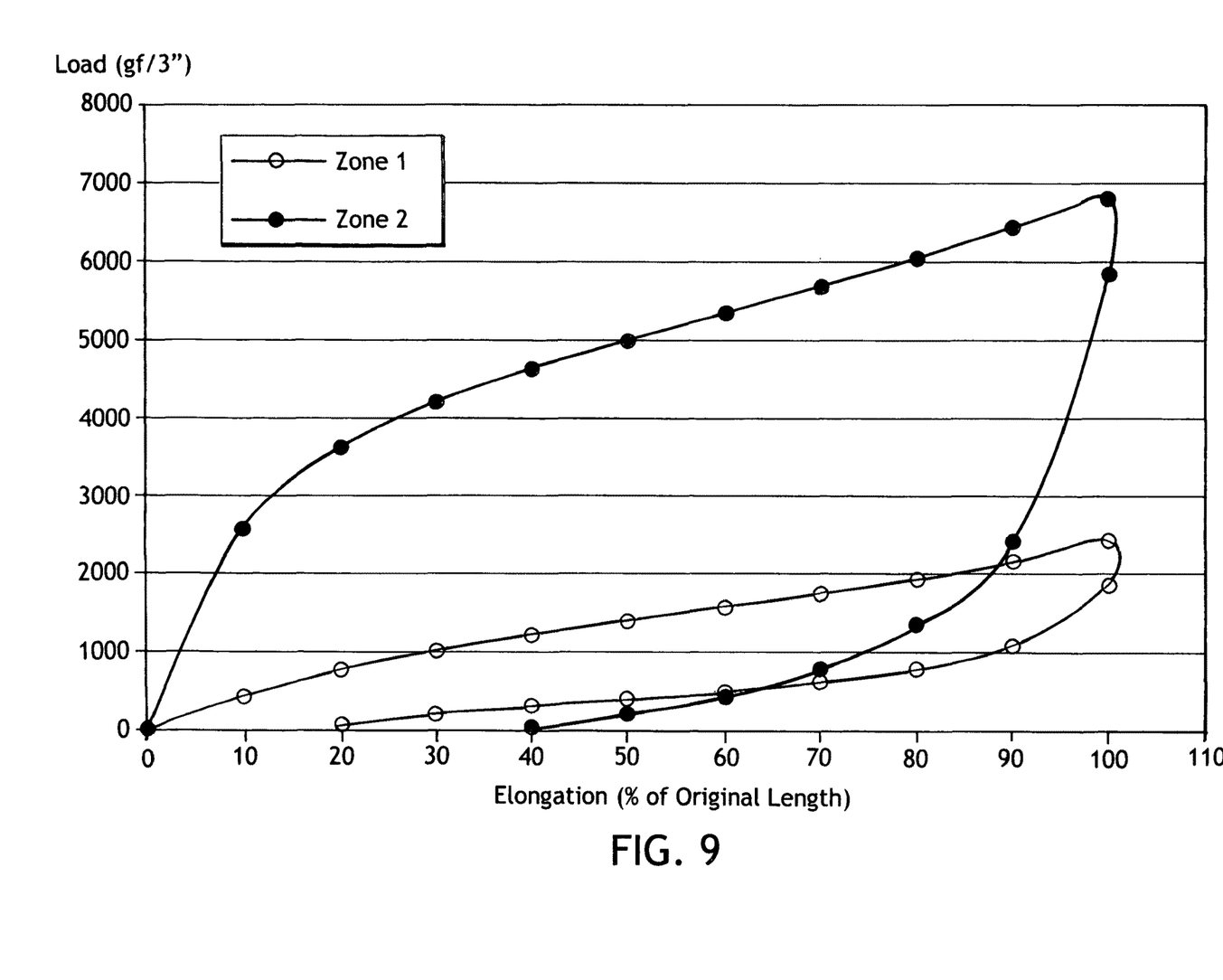
FIG. 9 is a chart depicting the hysteresis curves of an exemplary primary elastic region and an exemplary secondary elastic region.

Hysteresis curves for elastic materials can also be used to compare the characteristics of elastic materials under loads. In preparing hysteresis curves, the samples are subjected to various tension loads to extend the samples by a given percentage of their original length. Such a process was used to evaluate how much load was required to extend each sample a given percentage of their original length. Testing was conducted on the Sintech, Model MTS-1/S, Tensile Tester which is available from MTS Systems Corporation, Eden Prairie, Minn., USA, utilizing TESTWORKS for Windows 3.02 software to record the resulting data. In conducting the extension/retraction test, a three inch (7.6 cm) wide and six inch (15.2 cm) long section of material was utilized. Both ends of the section of material were clamped into the opposing jaws of the apparatus, so that one inch (2.5 cm) of the length on each end of the material is maintained within the jaws and two and a half inches (6.4 cm) of the length is available for stretching. Each material strip is stretched at a rate of 20 inches (50.8 cm) per minute to a specified elongation value and the load required to stretch the material strip is measured and recorded as the "loading energy." The material strip is then allowed to recover to a length where the stretching force is zero. The tests were conducted at ambient temperature and humidity conditions. The results are reported in Table 1, and the hysteresis curves for Samples 1 and 2 are shown in FIG. 9 as Zones 1 and 2, respectively.

TABLE 1

| Elongation % | Sample 1 Load gf/in$^3$ | Sample 2 Load gf/in$^3$ | Sample 3 Load gf/in$^3$ | Sample 4 Load gf/in$^3$ | Load Difference Samples 1 and 2 % | Load Difference Samples 1 and 3 % | Load Difference Samples 1 and 4 % |
|---|---|---|---|---|---|---|---|
| 0 | 0 | 0 | 0 | 0 | 0 | 0 | 0 |
| 10 | 412 | 2549 | 880 | 648 | 518 | 113 | 57 |
| 20 | 755 | 3606 | 1344 | 1034 | 378 | 78 | 37 |
| 30 | 995 | 4184 | 1627 | 1281 | 320 | 64 | 29 |
| 40 | 1197 | 4611 | 1849 | 1484 | 285 | 54 | 24 |
| 50 | 1381 | 4983 | 2046 | 1671 | 261 | 48 | 21 |
| 60 | 1555 | 5333 | 2239 | 1859 | 243 | 44 | 19 |
| 70 | 1734 | 5679 | 2438 | 2063 | 228 | 41 | 19 |
| 80 | 1928 | 6042 | 2657 | 2298 | 213 | 38 | 19 |
| 90 | 2154 | 6431 | 2907 | 2575 | 199 | 35 | 19 |
| 100 | 2422 | 6812 | 3185 | 2895 | 181 | 32 | 20 |
| 100 | 1849 | 5859 | 2240 | 2040 | 217 | 21 | 10 |
| 90 | 1074 | 2414 | 1096 | 991 | 125 | 2 | −8 |
| 80 | 775 | 1341 | 659 | 620 | 73 | −15 | −20 |
| 70 | 605 | 771 | 429 | 428 | 28 | −29 | −29 |
| 60 | 484 | 422 | 278 | 301 | −13 | −43 | −38 |
| 50 | 384 | 186 | 165 | 201 | −52 | −57 | −48 |
| 40 | 288 | 21 | 71 | 112 | −93 | −76 | −61 |
| 30 | 183 | — | — | 25 | — | — | −86 |
| 20 | 51.6 | — | — | — | — | — | — |
| 10 | — | — | — | — | — | — | — |
| 0 | — | — | — | — | — | — | — |

Also reported in Table 2 is the percent difference in load between Sample 1, the primary elastic region, and Samples 2-4 at various elongation percentages. As seen in the data in Table 2 and FIG. 9, the difference in load required to extend Samples 2 and 3 increasingly from 0% elongation to 90% elongation as compared to Sample 1 at the same percent elongation provide a sufficient increase in strength to enable processing of the laminate effectively, with Samples 2, 3 and 4 retaining elasticity. While the loads for Sample 4 are higher than the loads for Sample 1, the increase in strength is not sufficient to permit adequate processing of the laminate into products.

Peak load may be determined by testing a sample to failure, which is defined as complete rupture of the sample. After completion of the hysteresis cycle testing of each sample as noted above, the peak load of the sample was determined. After each sample was cycled to 100% of its original elongation and permitted to retract, a load was then applied until the sample ruptured. The peak load was determined to be the maximum load value incurred prior to rupture. The peak load values for Samples 1-4 are reported in Table 2.

TABLE 2

| | Peak Load (gf/in$^3$) | % Difference from Sample 1 |
|---|---|---|
| Sample 1 | 5400 | — |
| Sample 2 | 10501 | 94.5% |
| Sample 3 | 6262 | 16.0% |
| Sample 4 | 5524 | 2.3% |

Samples 2 and 3 demonstrated an improvement in peak loads which would be effective in improving the subsequent processing of the material into various products. Improvements in peak load in the range of at least about 10% are achievable with the present invention and would be effective in improving the processability of the laminate.

It should be understood that resort may be had to various other embodiments, modifications, and equivalents to the embodiments of the invention described herein which, after reading the description of the invention herein, may suggest themselves to those skilled in the art without departing from the scope and spirit of the present invention. Accordingly, all such modifications are intended to be included within the scope of this invention, which is defined in the following claims and all equivalents thereto. In addition, it should be noted that any given range presented herein is intended to include any and all lesser included ranges. For example, a range of from 45-90 would also include 50-90; 45-80; 46-89 and the like.

What is claimed is:

1. A laminate comprising:
   at least one necked fibrous web having a machine direction and a cross-machine direction;
   at least one elastic sheet laminated to the at least one necked fibrous layer;
   a primary elastic region having a basis weight and a thickness; and
   at least one secondary elastic region having
      a basis weight that is substantially the same as the basis weight of the primary elastic region,
      a thickness that is at least about one-third less than the thickness of the primary elastic region, and
      a width in the cross-machine direction and a length that is longer than the width, the width being between about one centimeter and about 30 centimeters;
   wherein about 20% to about 90% of the fibers in the necked material in the secondary elastic region are embedded in the elastic sheet, the primary elastic region having higher elasticity than the secondary elastic region.

2. The laminate of claim 1 wherein the thickness of the secondary elastic region is at least about one half of the thickness of the primary elastic region.

3. The laminate of claim 1 wherein about 30% to about 80% of the fibers in the necked material in the secondary elastic zone are embedded in the elastic sheet.

4. The laminate of claim 1, wherein the width of the at least one secondary elastic region is between about one centimeter and about 10 centimeters.

5. The laminate of claim 4, wherein the width of the at least one secondary elastic region is between about two centimeters and about eight centimeters.

6. A laminate comprising:
   at least one necked fibrous web having a machine direction and a cross-machine direction;
   at least one elastic sheet laminated to the at least one necked fibrous layer;
   a primary elastic region; and
   a secondary elastic region having the same basis weight as the primary elastic region;
   wherein the load required to extend the secondary elastic region is at least about 30% greater than the load required to extend the primary elastic region to an elongation between 10% and 90% of their original lengths and the peak load of the secondary elastic region is at least 10% greater than the peak load of the primary elastic region; and
   wherein the secondary elastic region has a width in the cross-machine direction that is at least about one centimeter and having a length that is longer than the width.

7. The laminate of claim 6 wherein the peak load of the secondary elastic region is at least 50% greater than the peak load of the primary elastic region.

8. The laminate of claim 6, wherein the difference in the load required to extend the secondary elastic region and the primary elastic region to an elongation between 10% and 90% of their original lengths is at least about 185%.

9. The laminate of claim 6, wherein about 30% to about 70% of the fibers in the necked material in the secondary elastic zone are embedded in the elastic sheet.

10. The laminate of claim 6, the primary elastic region and the at least one secondary elastic region each have a thickness, wherein the thickness of the secondary elastic region is at least about one half of the thickness of the primary elastic region.

* * * * *